United States Patent
Wang et al.

(10) Patent No.: US 7,409,871 B2
(45) Date of Patent: Aug. 12, 2008

(54) MASS FLOW METER OR CONTROLLER WITH INCLINATION SENSOR

(75) Inventors: Chiun Wang, Cypress, CA (US); Eric J Redemann, Corona Del Mar, CA (US)

(73) Assignee: Celerity, Inc., Austin, TX (US)

( * ) Notice: Subject to any disclaimer, the term of this patent is extended or adjusted under 35 U.S.C. 154(b) by 228 days.

(21) Appl. No.: 11/377,911

(22) Filed: Mar. 16, 2006

(65) Prior Publication Data

US 2007/0219650 A1  Sep. 20, 2007

(51) Int. Cl.
G01F 1/86 (2006.01)
G01F 15/02 (2006.01)
G01F 25/00 (2006.01)
G01F 7/00 (2006.01)
G01F 19/00 (2006.01)
G01F 23/00 (2006.01)
G01F 1/12 (2006.01)
G01F 1/50 (2006.01)
G01P 21/00 (2006.01)
G01N 11/00 (2006.01)
G01L 27/00 (2006.01)

(52) U.S. Cl. .................... 73/861.01; 73/1.16; 702/45; 702/50; 702/100

(58) Field of Classification Search .............. 73/1.16, 73/1.57, 53.04, 152.18, 152.29, 202.5, 820, 73/861.01, 861.02, 861.351, 861.34, 861.73; 702/45, 50, 55, 100; 700/282
See application file for complete search history.

(56) References Cited

U.S. PATENT DOCUMENTS

| | | | |
|---|---|---|---|
| 3,938,834 A | | 2/1976 | Oostenbrink |
| 4,056,975 A | | 11/1977 | LeMay |
| 4,067,238 A | * | 1/1978 | Oetiker .................. 73/861.73 |
| 4,083,242 A | * | 4/1978 | Heckel et al. ............ 73/861.34 |
| 4,100,801 A | | 7/1978 | LeMay |
| 4,127,842 A | * | 11/1978 | Hassler ........................ 367/94 |
| 4,190,085 A | | 2/1980 | Hasa et al. |
| 4,370,887 A | | 2/1983 | Sauer et al. |
| 5,027,662 A | | 7/1991 | Titlow et al. |
| 5,028,214 A | * | 7/1991 | Masuda ...................... 417/218 |
| 5,086,650 A | | 2/1992 | Harrington et al. |

(Continued)

FOREIGN PATENT DOCUMENTS

EP    0642000 B1    3/1995

(Continued)

*Primary Examiner*—Crystal Barnes-Bullock
(74) *Attorney, Agent, or Firm*—Lowrie, Lando & Anastasi, LLP (57) ABSTRACT

A thermal mass flow meter associated with an inclination sensor that detects an angle of inclination of at least one portion of a thermal mass flow sensor relative to at least one reference axis. Based upon the detected angle of inclination, the output signal of the mass flow meter that is indicative of the mass flow rate of fluid through the sensor may be compensated to account for any inaccuracies relating to the orientation in which the mass flow meter is installed. Inaccuracies for which compensation may be provided include thermal siphoning effects and fluid buoyancy effects. By compensating for such inaccuracies, the mass flow meter may be used in any orientation, and/or may be used in non-inertial (e.g., accelerating) environments. The flow meter may be used as a stand alone device, or incorporated in a thermal mass flow controller.

38 Claims, 4 Drawing Sheets

U.S. PATENT DOCUMENTS

| | | | |
|---|---|---|---|
| 5,191,573 A | 3/1993 | Hair | |
| 5,279,154 A | 1/1994 | Vavra et al. | |
| 5,672,832 A | 9/1997 | Cucci et al. | |
| 5,763,774 A | 6/1998 | Ha et al. | |
| 5,952,584 A | 9/1999 | Strubbe | |
| 5,970,802 A | 10/1999 | Strubbe | |
| 6,044,701 A | 4/2000 | Doyle et al. | |
| 6,138,518 A | 10/2000 | Strubbe | |
| 6,272,935 B1 | 8/2001 | Strubbe | |
| 6,557,408 B1 * | 5/2003 | Mueller et al. | 73/202.5 |
| 6,561,021 B2 * | 5/2003 | Uramachi et al. | 73/202.5 |
| 6,712,084 B2 | 3/2004 | Shajii et al. | |
| 6,845,659 B2 | 1/2005 | Lull | |
| 7,000,465 B1 | 2/2006 | L'Bassi et al. | |
| 7,222,029 B2 | 5/2007 | Larson | |
| 2006/0009926 A1 | 1/2006 | Larson | |
| 2007/0174016 A1 | 7/2007 | Ding et al. | |

FOREIGN PATENT DOCUMENTS

| | | | |
|---|---|---|---|
| GB | 2173910 A | | 10/1986 |
| JP | 60162925 A | * | 8/1985 |
| JP | 06159319 A | * | 6/1994 |

* cited by examiner

MASS FLOW METER OR CONTROLLER WITH INCLINATION SENSOR

BACKGROUND

1. Field of the Invention

Aspects of the present invention are directed to the measurement and control of the rate of flow of a fluid, and more particularly to a thermal mass flow sensor that may be included in a thermal mass flow meter or a thermal mass flow controller, and that is associated with an inclination sensor.

2. Discussion of the Related Art

Thermal mass flow meters and thermal mass flow controllers are well known in the art. It is also well known in the art that the orientation of a thermal mass flow meter (or a thermal mass flow controller) may affect its performance. For example, due to a phenomenon termed the "recirculation effect," the accuracy of a thermal mass flow meter (or thermal mass flow controller) may vary considerably from one orientation to another. This recirculation effect is now briefly described with respect to a conventional thermal mass flow controller depicted in FIG. 1.

Figure 1:
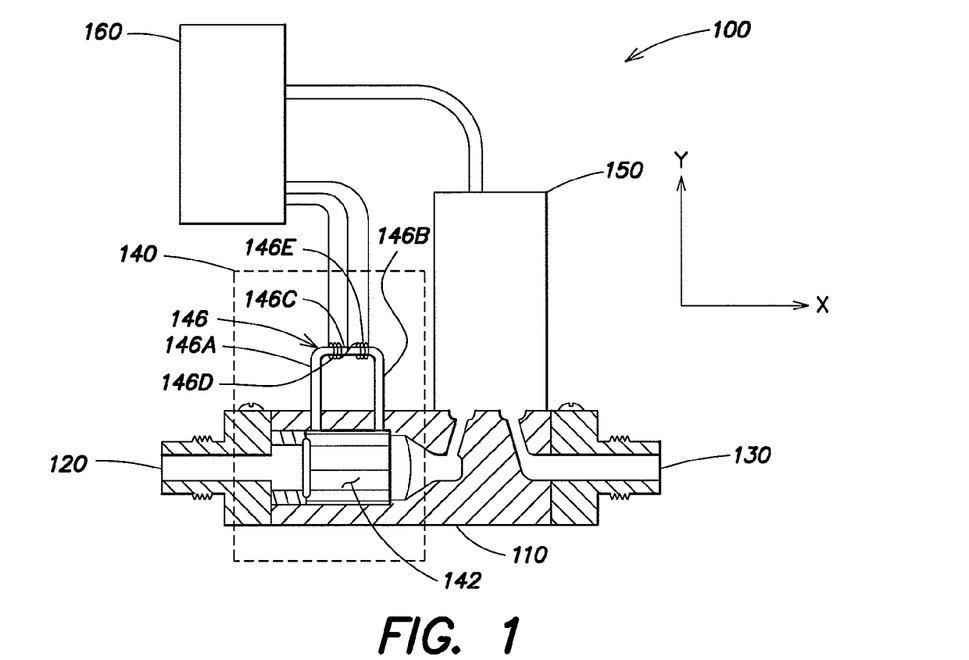
FIG. 1 illustrates a conventional mass flow controller in a first orientation.

As illustrated in FIG. 1, thermal mass flow controller 100 includes a base 110 having a fluid inlet 120 and a fluid outlet 130, a thermal mass flow meter 140, a valve 150, and some associated control electronics 160. In the illustrated example, the thermal mass flow meter 140 includes a pressure dropping bypass 142 through which a majority of fluid flows, and a thermal flow sensor 146 through which a smaller portion of the fluid flows. The thermal flow sensor 146 includes a sensor inlet portion 146A, a sensor outlet portion 146B, and a sensor measuring portion 146C about which two resistive coils or windings 146D, 146E are disposed.

In operation, electrical current is provided to the two resistive windings 146D, 146E which are in thermal contact with the sensor measuring portion 146C. The heat generated by the resistive windings 146D, 146E is used to heat the fluid flowing therein to a temperature that is above the temperature of the fluid flowing through the bypass 142. As known to those skilled in the art, the rate of flow of fluid in the flow sensor 146, which is proportional to the rate of flow of fluid through the mass flow controller 100, may be determined in a number of different ways, such as, by a difference in the resistance of the resistive windings, by a difference in the amount of energy provided to each resistive winding to maintain each winding at a particular temperature or at a particular temperature above ambient temperature, etc. Examples of the ways in which the flow rate of a fluid in a thermal mass flow meter may be determined are described, for example, in commonly owned U.S. Pat. No. 6,845,659 B2, which is incorporated by reference herein.

When the valve 150 is in a closed position and the thermal mass flow controller 100 is disposed in the position shown in FIG. 1 with the sensor measuring portion 146C oriented horizontally (i.e., with the sensor measuring portion oriented parallel to the X axis shown in FIG. 1), the fluid in the sensor measuring portion is heated to a temperature above that of the fluid in the bypass 142. Because of this heating, the density of the fluid in the sensor measuring portion is less than the density of the fluid in the cooler bypass 142. Thus, in the orientation shown, and with the valve in a closed position, a density gradient will develop and be maintained by the force of gravity, with the heavier and more dense fluid in the bypass and with the lighter (more buoyant) and less dense fluid in the sensor measuring portion.

Figure 2:
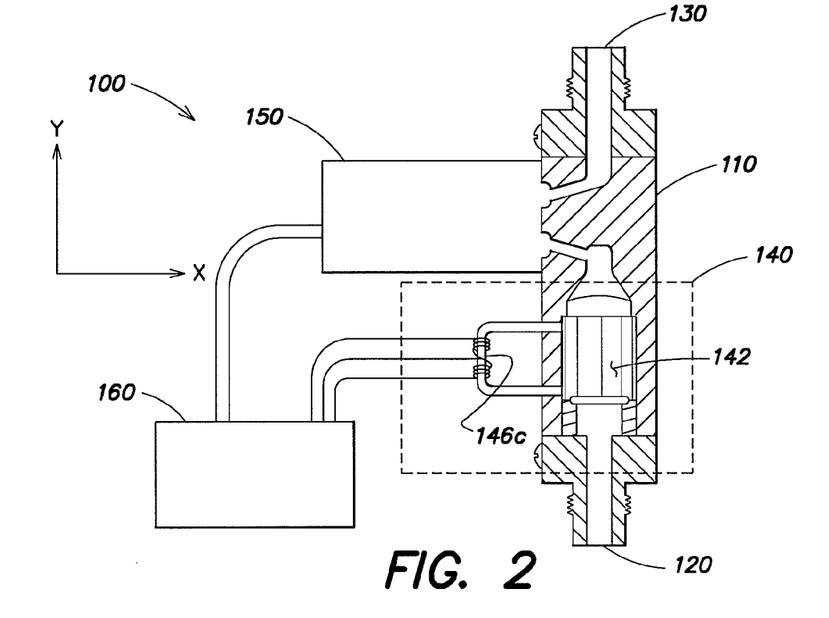
FIG. 2 illustrates the mass flow controller of FIG. 1 in a second orientation that is rotated ninety degrees counter-clockwise relative to the orientation shown in FIG. 1.

If, instead of being disposed in the orientation depicted in FIG. 1, the thermal mass flow controller 100 is instead disposed in a different orientation, for example, in the manner shown in FIG. 2 (i.e., with the sensor measuring portion 146C being oriented parallel to the Y axis), convective forces due to differences in temperature between the fluid in the sensor measuring portion and that in the bypass 142 and the force of gravity may give rise to a recirculation of fluid that can affect the accuracy by which flow rate is determined.

For example, with the valve 150 in a closed position and the thermal mass flow controller 100 disposed in the position shown in FIG. 2, the fluid in the sensor measuring portion 146C will again be heated to a temperature above that of the fluid in the bypass 142. As a result of this heating, the warmer and less dense fluid in the sensor measuring portion rises and flows out of the sensor outlet 146B where it contacts the bypass and cools, while the cooler fluid in the bypass is in turn pulled into the sensor inlet 146A and warmed by the resistive windings 146D, 146E. Due to a combination of convective forces and the force of gravity, a continuous circulation loop is created which will be detected as a flow of fluid by the control electronics associated with the mass flow controller, despite the fact that the valve is closed. It should be appreciated that depending upon the orientation of the mass flow controller, this false flow signal may be detected as a positive (e.g., increased) flow of fluid (for example, in the orientation shown in FIG. 2) or as a negative (e.g., decreased) flow of fluid. Further, although the effect of such recirculation is most noticeable when the valve 150 is in a closed position, it should be appreciated that this phenomenon will also affect the accuracy by which flow rate is determined when the valve is open, with its impact being more significant at lower flow rates and with more dense fluids.

A number of different mass flow meters and/or mass flow controller designs have attempted to mitigate the effects of recirculation, such as, for example, those described in commonly owned U.S. Pat. Nos. 5,279,154 and 6,044,701. Although the devices disclosed in the afore-mentioned U.S. patents do reduce the effects of recirculation, that reduction is generally dependent upon installing and using the mass flow meter and/or mass flow controller in the specific orientation in which it was designed to be used.

SUMMARY OF THE INVENTION

Embodiments of the present invention are directed to a thermal mass flow sensor that may be included in a thermal mass flow meter or a thermal mass flow controller and that is associated with an inclination sensor that detects an angle of inclination of at least one portion of the thermal mass flow sensor relative to at least one reference axis. Based upon the detected angle of inclination, the output signal provided by the thermal mass flow sensor that is indicative of the mass flow rate of fluid through the sensor may be compensated to account for inaccuracies relating to the orientation in which the mass flow meter or mass flow controller is installed. Such inaccuracies may include, but are not limited to recirculation effects, exterior effects, and density effects.

According to one aspect of the present invention a mass flow meter having a fluid inlet and a fluid outlet is provided. The mass flow meter comprises a thermal mass flow sensor to provide a first electrical signal indicative of a mass flow rate of a fluid flowing between the fluid inlet and the fluid outlet, at least one inclination sensor, and a controller. The thermal mass flow sensor has a sensor inlet portion fluidly connected to the fluid inlet, a sensor outlet portion fluidly connected to the fluid outlet, and a sensor measuring portion disposed between and fluidly connected to the sensor inlet portion and the sensor outlet portion. The at least one inclination sensor is adapted to provide at least one second electrical signal indicative of an angle of inclination of at least one of the sensor inlet portion, the sensor outlet portion, and the sensor measuring portion relative to at least one reference axis. The controller is adapted to receive the first electrical signal and the at least one second electrical signal, calculate a correction factor based upon the at least one second electrical signal, and apply the correction factor to the first electrical signal to provide a third electrical signal indicative of the mass flow rate of the fluid flowing between the fluid inlet and the fluid outlet that is compensated for the angle of inclination of the at least one sensor portion relative to the at least one reference axis.

In accordance with one embodiment, the mass flow meter further comprises an adjacent fluid flow path having a flow path inlet disposed proximate to the sensor inlet portion and fluidly connected to the fluid inlet, and a flow path outlet disposed proximate to the sensor outlet portion and fluidly connected to the fluid outlet. In accordance with a further embodiment, the at least one second electrical signal is indicative of an angle of inclination of the sensor inlet portion, the sensor outlet, and the sensor measuring portion relative to three orthogonal reference axes. In this embodiment, the third electrical signal is compensated for recirculation of fluid between the thermal mass flow sensor and the adjacent fluid flow path and for differences in a density of the fluid in the sensor inlet portion and the density of the fluid in the sensor outlet portion. In accordance with yet a further embodiment, the thermal mass flow sensor is enclosed within a sensor housing, the sensor housing is enclosed within a second outer housing, and the third electrical signal is further compensated for convective effects between the sensor housing and the second outer housing.

In accordance with another aspect of the present invention, a method of determining a mass flow rate of a fluid flowing in a fluid flow path is provided. The fluid flow path includes a sensor flow path having a sensor inlet portion, a sensor outlet portion, and a sensor measuring portion. The method comprises acts of determining a flow rate of the fluid flowing in the sensor measuring portion of the sensor flow path, determining an angle of inclination of at least one of the sensor inlet portion, the sensor outlet portion, and the sensor measuring portion relative to at least one reference axis, calculating at least one correction factor based upon the determined angle of inclination of the at least one of the sensor inlet portion, the sensor outlet portion, and the sensor measuring portion relative to the at least one reference axis; and determining the mass flow rate of the fluid flowing in the fluid flow path based upon the determined flow rate of the fluid flowing in the sensor measuring portion of the sensor flow path and the at least one calculated correction factor.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Various embodiments and aspects thereof will now be described in more detail with reference to the accompanying figures. It is to be appreciated that this invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

Figure 3:
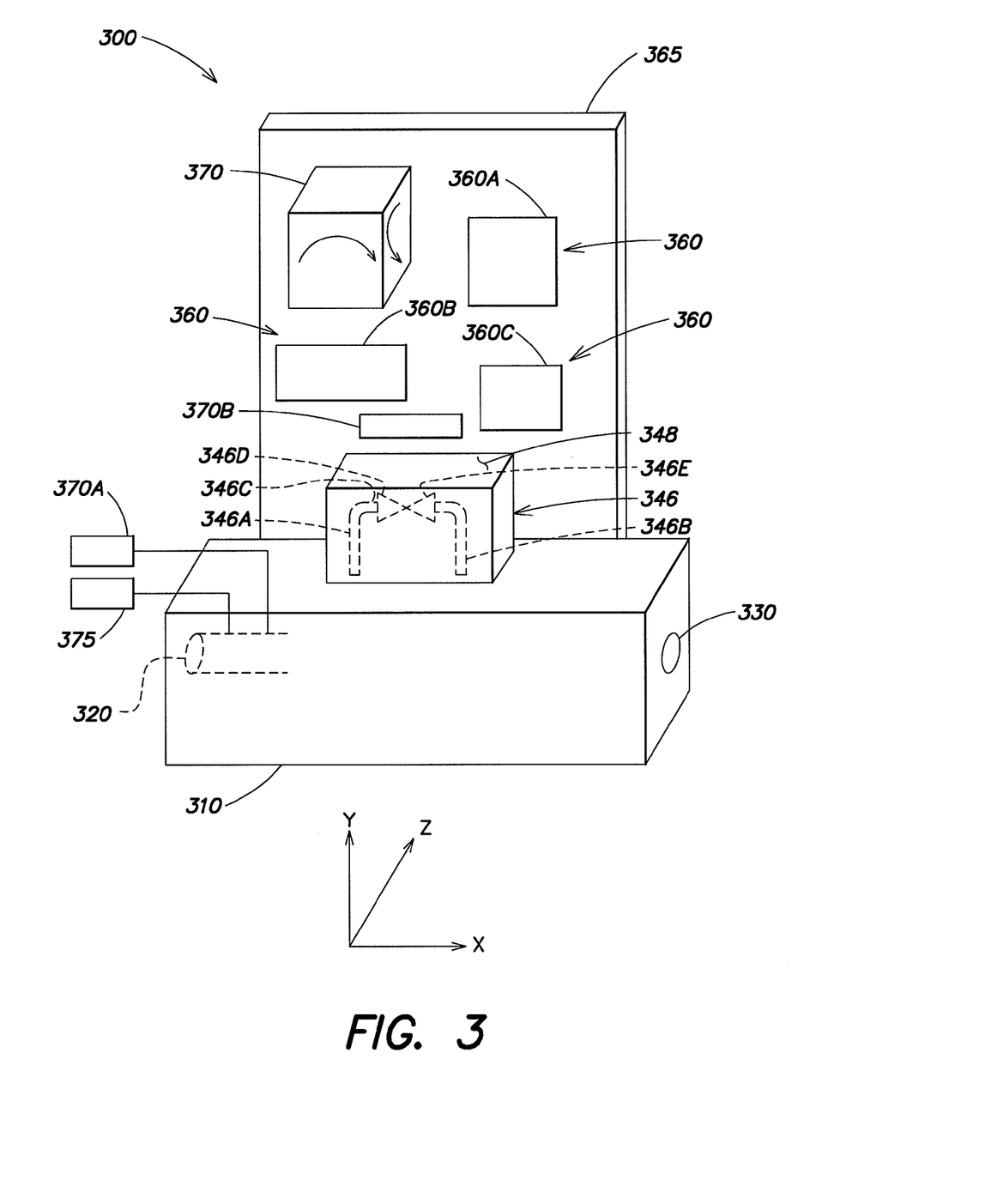
FIG. 3 illustrates a functional block diagram of a mass flow meter in accordance with an embodiment of the present invention.

FIG. 3 illustrates a functional block diagram of a thermal mass flow meter in accordance with one embodiment of the present invention. It should be appreciated that although the present invention is described in terms of a thermal mass flow meter, aspects of the present invention apply equally to a thermal mass flow controller (e.g., a thermal mass flow meter and a controlled valve) as described more fully below, whether the thermal mass flow meter and the controlled valve are integrated into a single device (e.g., a mass flow controller), or used in a distributed manner, and irrespective of whether the controlled valve is disposed upstream or downstream of the mass flow meter. Moreover, although the present invention is described in terms of a thermal mass flow meter in which a process fluid is heated, aspects of the present invention apply equally well to a thermal mass flow meter or thermal mass flow controller in which a process fluid is cooled, rather than heated. These aspects are now described in detail with reference to FIG. 3.

As shown in FIG. 3, the thermal mass flow meter 300 includes a base 310 having a fluid inlet 320 and a fluid outlet 330, a thermal mass flow sensor 346, and some associated electronics 360. Where the thermal mass flow meter is used to control toxic or reactive fluids such as those used in semiconductor processing, the base 310 may be made of a suitable type of material, such as stainless steel. Depending on the particular application requirements, the base 310 may be made or formed from other suitable materials, such as aluminum, brass, or plastic, as the present invention is not limited to any specific materials from which the base is formed.

The thermal mass flow sensor 346 includes a sensor inlet portion 346A that is fluidly coupled to the fluid inlet 320 to receive a portion of the process fluid received at the fluid inlet 320, a sensor outlet portion 346B that is fluidly coupled to the fluid outlet 330, and a sensor measuring portion 346C about which two resistive coils or windings 346D, 346E are disposed and which is fluidly coupled to the sensor inlet portion and the sensor outlet portion. The sensor inlet portion, the sensor outlet portion, and the sensor measuring portion are typically formed from a unitary tube or conduit of suitable material, such as stainless steel, in a conventional manner, although the tube need not be unitary and other types of suitable material may be used. The thermal mass flow meter 300 may include a pressure dropping bypass (not shown in FIG. 3, but depicted in FIGS. 1 and 2) through which a remaining portion of the fluid received at the fluid inlet 320 flows, for those implementations where the thermal mass flow meter or controller is designed for use with higher flow rates.

Although not depicted in detail, the control electronics 360 will typically include some form of a controller 360A, such as a microprocessor or digital signal processor, some memory 360B (such as RAM, ROM, flash memory, or combinations thereof) operatively connected to the controller that can store code and/or data to be executed and/or used by the controller, and the electronics 360C associated with the thermal mass flow sensor. The control electronics 360 process an electrical signal provided by the thermal mass flow sensor 346 that is indicative of a flow rate of fluid through the thermal mass flow sensor and provide an output signal that is indicative of the mass flow rate of fluid through the thermal mass flow meter 300. As will be described further in detail below, this output signal may be compensated to account for any inaccuracies relating to the orientation of the thermal mass flow sensor.

The control electronics 360 will typically be mounted to a printed circuit board 365 that is attached to the thermal mass flow sensor 346, the base 310, or both. It should be appreciated that the control electronics and the printed circuit board need not be attached to either the thermal mass flow sensor or the base, or even integrated with the thermal mass flow sensor, but may be separately disposed therefrom. For example, in certain applications it may be desirable to locate the control electronics in one location, and the rest of the thermal mass flow meter in another location, such as where the control electronics are used to control more than one mass flow sensor, or where the control electronics are used to monitor and/or control other devices. Examples of the types of control electronics that may be used with the thermal mass flow meter 300 are described, for example, in the afore-mentioned '659 patent.

Typically, the thermal mass flow sensor 346 will be enclosed within a sensor housing 348 that is attached to the base 310 to isolate the mass flow sensor 346 from the ambient environment. The sensor housing 348 may be at least partially filled with an insulating material (not shown), such as an insulating foam or insulating fibers (although other approaches may be used), to limit the amount of convection that can occur within the sensor housing 348, and to further isolate the mass flow sensor 346 from the ambient environment. Where the control electronics 360 and the printed circuit board 365 are integrated with the thermal mass flow sensor 346 to form an integrated thermal mass flow meter, a second housing (not shown) may be attached to the base 310 that encloses the mass flow sensor 346, the sensor housing 348, the control electronics 360, and the printed circuit board 365 for purposes such as EMI/RFI shielding, safety reasons, aesthetic reasons, etc. Irrespective of whether other components such as the control electronics and the printed circuit board are integrated with the thermal mass flow sensor, the second housing may be used to further isolate the mass flow sensor from any other devices which could impact the operation of the mass flow meter.

In accordance with an aspect of the present invention, the thermal mass flow meter 300 also includes an inclination sensor 370 that is capable of providing a signal indicative of the angle of inclination of at least one of the sensor inlet portion 346A, the sensor outlet portion 346B, and the sensor measuring portion 346C relative to at least one reference axis. In most thermal mass flow sensors, the sensor inlet portion 346A, the sensor outlet portion 346B, and the sensor measuring portion 346C are aligned in the same plane (e.g., the X-Y plane) in the manner shown in FIG. 3, with the sensor inlet portion 346A and the sensor outlet portion 346B being generally perpendicular to, and substantially shorter in length than, the heated (or cooled) sensor measuring portion 346C. Because the sensor measuring portion is typically the longest portion of the sensor, and its angle of inclination tends to have the strongest impact on recirculation, it is preferable that the inclination sensor 370 be capable of providing an indication of the angle of inclination of the sensor measuring portion 346C relative to at least one reference axis. However, because the shape of flow sensor is generally known, it should be appreciated that the inclination sensor 370 may alternatively provide an indication of the angle of inclination of either the sensor inlet portion 346A, the sensor outlet portion 346B, or both, as the angle of inclination of one sensor portion may be used to determine the angle of inclination of another sensor portion, provided the shape of the flow sensor is known.

In the illustrated embodiment of FIG. 3, where the sensor measuring portion 346C is generally parallel to a length of the base 310 and the X axis, the inclination sensor 370 is capable of indicating the angle of inclination with respect to at least the X axis (this may be alternatively stated as the inclination sensor is capable of indicating rotation of the sensor measuring portion about the Z axis). Preferably, however, and in the embodiment depicted in FIG. 3, the inclination sensor is capable of indicating the angle of inclination with respect to more than one axis, and more preferably still, is capable of indicating the angle of inclination with respect to those axes that have the greatest effect on the accuracy of the thermal mass flow meter 300.

Thus, for example, in the embodiment of FIG. 3, the inclination sensor 370 is capable of indicating the angle of inclination of the sensor measuring portion 346C with respect to the X and Y axes (or alternatively, that the inclination sensor is capable of indicating rotation of the sensor measuring portion about the Z and X axes, respectively). Stated in aeronautical terms, the inclination sensor 370 is preferably capable of indicating the pitch and roll of the sensor measuring portion 346C. It should be appreciated that with reference to FIG. 3, these axes identify whether the sensor measuring portion is disposed horizontally, vertically, or somewhere therebetween, and also identify the direction in which the sensor inlet and sensor outlet portions (i.e., the "legs" of the sensor) point.

Although the angle of inclination of the sensor measuring portion has a significant impact on recirculation, there are other physical phenomena that may affect the accuracy of a thermal mass flow meter, and which relate to the angle of inclination of one or more of the sensor inlet portion 346A, the sensor outlet portion 346B, and the sensor measuring portion 346C. One of these phenomena, termed the "exterior effect" herein, addresses the fact that the manner and the amount or rate of heat (or cooling) dissipated by the sensor housing 348 to its surrounding ambient environment may change dependent upon the orientation of the thermal mass flow meter. Another of these phenomena, termed the "density effect," or alternatively, the "rho-g-h effect" herein, addresses the fact that the combination of the different densities of fluid in the sensor inlet and outlet portions 346A, 346B and the angle of inclination of the sensor inlet and sensor outlet portions may give rise to a temperature induced buoyancy that can resist or aid the flow of fluid through the sensor. Although both of these effects are described in more detail further below, by detecting the angle of inclination of a portion of the sensor with respect to at least one reference axis, correction factors that account for errors in the measured flow rate due to the recirculation effect, the exterior effect, the density effect, or to any other orientation dependent effects, may be determined and applied to the mass flow signal provided by the thermal mass flow meter.

In accordance with one embodiment, the inclination sensor is capable of providing an indication of the angle of inclination of the sensor measuring portion 346C with respect to three orthogonal axes, two of which are orthogonal to a longitudinal axis of the sensor measuring portion, and the other of which is aligned with the longitudinal axis of the sensor measuring portion. In the embodiment depicted in FIG. 3, these three orthogonal axes correspond to the X, Y, and Z axes, and the inclination sensor is therefore capable of indicating rotation of the sensor measuring portion about the Z, X, and Y axes, respectively. Although the most significant impact on recirculation relates to the angle of inclination of the sensor measuring portion with respect to the X axis (i.e., rotation about the Z axis in FIG. 3), the angle of inclination with respect to the Y axis (i.e., rotation about the X axis in FIG. 3, or alternatively the direction in which the sensor inlet and outlet portions point) has a typically lesser, but nonetheless measurable effect on the accuracy of the thermal mass flow meter by virtue of the aforementioned density effect.

In accordance with embodiments of the present invention, the inclination sensor 370 (also termed a tilt, grade, attitude, or orientation sensor) may be any one of a variety of well known inclination sensors, such as an electro-mechanical inclination sensor, a piezo-electric inclination sensor, a liquid tilt inclination sensor, an optical or magnetic induction inclination sensor, a thermal or capacitive MEMS inclination sensor (available from Analog Devices, Inc. or Motorola), bulk or surface micro-machined, or combinations thereof. The inclination sensor is installed in a manner such that at least one, and preferably two of its active axes of tilt are not parallel to the sensor measuring portion 346C, and more preferably, are orthogonal to the longitudinal axis of the sensor measuring portion. Where an inclination sensor (or sensors) with three active axes of tilt is (are) used, the third active axis of tilt would preferably be parallel with the longitudinal axis of the sensor measuring portion. It should be appreciated that although the active axes of tilt are preferably orthogonal to one another, this is not required, as the contribution of all three axes may be determined by suitable trigonometry.

In the embodiment depicted in FIG. 3, the inclination sensor 370 is attached to the printed circuit board 365, which is, in turn, attached to the base 310. It should be appreciated that the inclination sensor 370 may be placed in other locations, as long as the orientation of the active axes of tilt of the inclination sensor have a known correspondence to the orientation of the thermal mass flow sensor 346. Thus for example, the inclination sensor 370 may be attached to the base 310 or to any other portion of the flow meter having a known correspondence to the orientation of the sensor, such that it is capable of correctly identifying the inclination of at least one portion of the thermal mass flow sensor relative to at least one reference axis.

It should be appreciated that the degree to which recirculation affects the accuracy of the thermal mass flow meter will depend upon the angle of inclination of the thermal mass flow sensor as well as a number of other factors. Factors which can affect recirculation include the species (i.e., type) of fluid used (e.g., Nitrogen or $SF_6$), temperature (both the ambient temperature of the environment in which the flow meter operates and the temperature to which the fluid is elevated (or reduced) in the sensor measuring portion), pressure, and the rate of fluid flow. Other factors can include those related to the sensor itself, such as the length of the sensor inlet portion 346A and the sensor outlet portion 346B and the length of the sensor measuring portion 346C, the internal diameter of the tube from which the sensor is formed, the internal surface finish of the tube from which the sensor is formed, etc., and whether the longitudinal axis of the sensor measuring portion is aligned with the direction of the force of gravity or other direction of forces of acceleration.

In accordance with one embodiment of the present invention, the mass flow meter 300 may include one or more temperature sensors 370A, 370B, and one or more pressure sensors 375, each of which is capable of communicating with the controller 360A. In the illustrative embodiment shown in FIG. 3, the temperature sensor 370A is disposed in thermal communication with the inlet 320 of the mass flow meter, and is thus capable of indicating the temperature of the process fluid entering the mass flow meter. Where the base 310 is made from a thermally conductive material, such as stainless steel, aluminum, or brass, this temperature will generally be indicative of the temperature of the fluid throughout the mass flow meter, with the exception of the fluid in the thermal mass flow sensor 346 itself. Such a knowledge of the temperature of the process fluid entering the mass flow meter, when combined with a knowledge of the amount of heat (or cooling) provided by the resistive coils or winding 346D, 346E, may provide a more accurate determination of the density and/or viscosity of the fluid in the various portions of the mass flow meter. In an alternative embodiment, multiple temperature sensors 370A may be used, and may be disposed in thermal communication with the sensor inlet and outlet portions 346A, 346B of the thermal mass flow sensor 346 (not shown). By disposing temperature sensors 370A in thermal communication with the inlet and outlet portions of the sensor, a more precise knowledge of the temperature of the process fluid entering and exiting the thermal mass flow sensor 346 may be provided. This more precise knowledge of the temperature of the fluid may be used to more accurately determine any orientation dependent errors associated with the recirculation effect, as well as any orientation dependent errors due to the density effect, as described in detail further below. The placement of temperature sensors in or proximate to the inlet and outlet portions of the thermal mass flow sensor may also be used to determine any offsets in the mass flow signal provided by the sensor 346 that, while generally independent of the orientation of the sensor, may be due to the fact that the fact that upstream and downstream coils or windings 346D, 346E are tied to different thermal grounds, and while thermally connected via the base 310, may have slightly different temperatures.

In addition to one or more temperature sensors 370A disposed in thermal communication with the process fluid, the mass flow meter 300 may also include a temperature sensor 370B disposed within the mass flow meter, but not in thermal communication with the process fluid flowing therein. For example, the temperature sensor 370B may be disposed on the printed circuit board 365 proximate to the sensor housing 348 to measure the temperature of the environment adjacent thereto. Such an indication of the temperature of the environment surrounding the sensor housing may be used to determine the amount of error due to exterior effects, as described in detail further below.

As noted previously above, the mass flow meter 300 may also include one or more pressure sensors 375 also capable of communicating with the controller 360A. Knowledge of the pressure of the process fluid flowing in the mass flow meter 300 may also be used to provide a better determination of the density and/or viscosity of the fluid (which may be used to determine the amount of error associated with the recirculation effect and the density effect, as discussed further in detail below), and may also, dependent upon the location where the pressure sensor is placed, be used to compensate for pressure transients. For example, in the embodiment shown in FIG. 3 where the pressure sensor 375 is disposed proximate to the inlet 320 of the mass flow meter 300, and the mass flow meter 300 is associated with a controlled valve disposed downstream of the mass flow meter (e.g., in the manner shown in FIG. 5), the pressure signal may also be used to compensate for pressure transients in the manner described in commonly owned U.S. patent application Ser. No. 10/622,080, entitled METHODS AND APPARATUS FOR PRESSURE COMPENSATION IN A MASS FLOW METER. Alternatively, the pressure sensor 375 may instead be disposed proximate to the outlet of the mass flow meter 300 and upstream of an associated control valve, and may be used to compensate for pressure transients in the manner described in U.S. Pat. Nos. 6,712,084 and 6,932,098. Such a placement of a pressure sensor proximate to the outlet of the mass flow meter 300 would also be advantageous when used with an associated valve that is disposed upstream of the mass flow meter in the manner disclosed in U.S. Pat. Nos. 4,687,020 and 6,425,281 to better understand the regime in which the flow meter is operating, as the transfer function of the mass flow sensor (e.g., the change in output signal level relative to the change in flow rate) may change when the pressure drops below a design specific threshold of the thermal mass flow sensor. It should be appreciated that such a pressure sensor 375 may be placed anywhere between the inlet 320 and the outlet 330 of the main fluid flow path of the mass flow meter and provide meaningful information relating to any orientation dependent effects, although that placement may vary dependent upon other intended uses for that pressure information.

In accordance with one embodiment of the present invention, based upon knowledge of the orientation of the thermal mass flow sensor as provided by the inclination sensor, corrections for the inaccuracies of a flow meter caused by the effects of recirculation may be determined and applied to the output signal provided by the thermal mass flow meter. It should be appreciated that in other embodiments, correction for other inaccuracies (i.e., other than, or in addition to the recirculation effect, such as the exterior effect and the density effect) attributable to the orientation of the thermal mass flow sensor may be provided, as discussed in further detail below.

In one embodiment, after the flow meter is installed in its service position, a configuration routine may be performed wherein the orientation of the thermal mass flow sensor is determined. Based upon this determination, a correction factor for the effects of recirculation (or any other orientation dependent effects) may be calculated. The calculated correction factor may then be applied to the flow rate signal provided by the thermal mass flow meter to account for any recirculation induced errors (or any other induced errors) due to the orientation in which the flow meter is installed. The configuration routine may be stored in a memory of the flow meter, or alternatively, may be stored on another device, such as a service computer, that communicates with the flow meter.

In an alternative embodiment, rather than determining an orientation of the thermal mass flow sensor initially after installation of the thermal mass flow meter in its service position, such a determination may be performed more frequently, for example, during operation of the mass flow meter. The determination of the orientation of the mass flow sensor may be performed at repeated intervals that are spaced relatively far apart in time, or may alternatively be repeated during each operational cycle of the flow meter (e.g., at each interval wherein the mass flow rate of the fluid is determined) to permit the mass flow meter to provide an output signal that is compensated for any recirculation effects, or as discussed further in detail below, for any other error effects attributable to the orientation of the thermal mass flow sensor. An exemplary calculation for the error induced by the recirculation effect and the orientation of the thermal mass flow sensor may take the following form:

$$e_{Recirculation} = \frac{C \cdot f(I) \cdot (\overline{\rho_B} - \overline{\rho_S})}{\overline{\mu_S}} \qquad \text{(Equation 1)}$$

Where
$e_{Recirculation}$=Recirculation effect correction factor;
C=A fixed gain or proportionality constant;
$\overline{\rho_B}$=Mean density of the fluid in the bypass or main fluid path;
$\overline{\rho_S}$=Mean density of the fluid in the mass flow sensor;
$\overline{\mu_S}$=Mean viscosity of the fluid in the mass flow sensor; and
$f(I)$=A function of the inclination of the mass flow sensor reported by the inclination sensor.

The inclination I reported by the inclination sensor will typically be an electrical signal that relates the orientation of the inclination sensor relative to a reference position, and which may be converted into appropriate units of inclination (e.g., degrees) for use in the above equation. The function $f(I)$ would typically be a trigonometric function, such as sin(I) or cos(I) appropriately scaled into correct units. For example, where the inclination sensor provides an output signal of 0 to 5 volts, with 0 volts corresponding to 0° and 5 volts corresponding to 90°, an output signal of 2.5 volts would correspond to an inclination angle of 45° relative to the reference axis, and thus $f(I)$ would assume a value of 0.707 using either sin(45°) or cos(45°).

Where, for example, the process fluids are gases, the fluid densities in the above expression may be estimated from experience, or alternatively, may be calculated in accordance with appropriate gas laws, available pressure and temperature data, and fluid specific information stored in a memory of the thermal mass flow meter or another device, such as a service computer. The recirculation effect correction factor may then be added (or subtracted) to the mass flow signal to provide a corrected mass flow signal that accounts for any recirculation effects due to the orientation of the flow meter in its service position.

In accordance with another embodiment of the present invention, a correction factor that takes account of both the recirculation effect and the exterior effect may be provided. Like the correction factor for the recirculation effect, this correction factor may be calculated initially after the flow meter is installed in its service position, or may be periodically repeated during operation of the mass flow meter. However, unlike the recirculation effect, the exterior effect does not require a continuous circulation loop (e.g., formed by a first flow path, such as that through the bypass or body of the mass flow meter, and a second flow path such as that through the sensor), and may impact the accuracy of any thermal mass flow meter, including those in which the entire flow of process fluid flows through the sensor, as well as those in which only a portion of the process fluid flows through the sensor.

The exterior effect encompasses both the amount (e.g., rate) and manner in which heat (or cooling) is shed by the sensor housing 348 that encloses the thermal mass flow sensor 346, and is affected by such things as the type of insulation used within the sensor housing and the symmetry of that insulation relative to the sensor 346. Where the various components of the mass flow meter, such as the thermal mass flow sensor 346, the sensor housing 348, and the control electronics 360 are enclosed within a second outer housing, the amount and manner in which heat (or cooling) is shed by the sensor housing 348 may also be affected the placement of the other components (e.g., control electronics 360) of the mass flow meter. For example, electronic devices such as voltage regulators, processors, and valve electronics (where the mass flow meter is integrated in a mass flow controller) may generate heat that affects the amount and manner in which heat is shed by the sensor housing. Where the mass flow meter is operated in an orientation different from that in which it was intended, the change in orientation may change convective forces within that outer housing, resulting in an offset error at any flow rate, including zero-flow. An exemplary calculation for the error induced by both the recirculation effect and the exterior effect may take the following form:

$$e_{Recirculation+Exterior} = \frac{C \cdot f(I) \cdot (\overline{\rho_B} - \overline{\rho_S})}{\overline{\mu_S}} + D \cdot I \quad \text{(Equation 2)}$$

Where
$e_{Recirculation+Exterior}$=Combined Recirculation and Exterior effect correction factor;
C=A fixed gain or proportionality constant;
D=Another fixed constant;
$\overline{\rho_B}$=Mean density of the fluid in the bypass or main fluid path;
$\overline{\rho_S}$=Mean density of the fluid in the mass flow sensor;
$\overline{\mu_S}$=Mean viscosity of the fluid in the mass flow sensor; and
$f(I)$=A function of the inclination of the mass flow sensor reported by the inclination sensor.

In the above Equation 2, the first expression corresponds to the error induced by the recirculation effect described above with respect to Equation 1, and the second expression corresponds to the error induced by the exterior effect. The fixed constant D may, for example, be empirically determined by calibrating the mass flow meter under vacuum conditions and detecting the zero offset at a variety of different orientations.

Although the recirculation effect, and to a generally lesser extent, the exterior effect may give rise to certain inaccuracies in the output signal provided by a thermal mass flow meter, other orientation dependent effects may also affect the accuracy of a thermal mass flow meter, such as the previously mentioned density effect. Unlike the previously described exterior effect and like the recirculation effect, this density effect generally requires a continuous circulation loop (e.g., formed by a first flow path, such as that through the bypass or body of the flow meter, and a second flow path, such as that through the sensor). However, unlike both the previously described recirculation and exterior effects in which orientation-dependent inaccuracies in the output signal provided by the thermal mass flow meter are reflected primarily in terms of an offset in the output signal (e.g., a shift in the entire curve of the mass flow meter relating the output signal to the mass flow rate) that is relatively fixed across different flow rates, the orientation-dependent inaccuracies in the output signal provided by the thermal mass flow meter that are attributable to the density effect may change dependent upon the flow rate of the fluid. That is, the orientation-dependent inaccuracies in the output signal provided by the mass flow meter due to density effects are reflected primarily in terms of a change in the gain of the mass flow meter that shifts one portion of the transfer function curve of the mass flow meter (e.g., relating the output signal of the mass flow meter to the mass flow rate of the fluid) more than another. For most thermal mass flow meters, this change in gain effects the high flow region of the curve more than the low flow region, and for certain fluids having a high molecular weight (e.g., $SF_6$), the induced error due to this effect can be on the order of 1% or more.

Referring to FIG. 3, due to the heating (or cooling) that takes place in the sensor measuring portion 346C, the temperature of the fluid in the sensor inlet portion 346A of the sensor will be different than the temperature of the fluid in the sensor outlet portion 346B of the sensor. In the case of a sensor measuring portion that is heated, the temperature of the fluid entering the sensor inlet portion will be at a lower temperature than that of the fluid exiting the sensor outlet portion (frequently by 50° C., 100° C., or even more), with the hotter and less dense fluid exiting the sensor outlet portion being more buoyant than that entering the sensor inlet portion. Where the sensor is disposed in the orientation shown in FIG. 3 with the sensor inlet and outlet portions 346A, 346B pointing downward in the Y direction and aligned with the force of gravity, the more buoyant fluid exiting the sensor outlet portion 346B will have a tendency to resist the flow of fluid through the sensor. Alternatively, where the sensor is disposed in an orientation where the sensor inlet portion 346A and the sensor outlet portion 346B extend in the Z direction (i.e., extend in a direction perpendicular to the force of gravity), this density effect will have little impact on the accuracy of the flow meter, and where the sensor is disposed in an orientation where the sensor inlet portion and the sensor outlet portion extend upwardly toward the base (i.e., rotated 180° about the X-axis in FIG. 3), this density effect will have a tendency to aid the flow of fluid through the sensor.

In accordance with another aspect of the present invention, the error in the accuracy of a thermal mass flow meter due to its orientation and this density effect may be determined, and the output signal provided by the thermal mass flow meter compensated to account therefore. This effect and the manner in which inaccuracies in the mass flow signal provided by the thermal mass flow meter may be compensated to account for this effect are now described below.

As previously noted, the density effect may alternatively be described as a "rho-g-h effect" due to the various parameters that contribute to this effect. These are the density of the fluid flowing in the sensor, typically denoted by the Greek Letter "rho" or "ρ," the acceleration forces acting on the thermal mass flow sensor (typically due to the force of gravity) and denoted "g," and the effective height, in the direction of gravitational acceleration of the legs of the sensor (i.e., the sensor inlet portion and the sensor outlet portion), denoted "h." For example, for gaseous fluids, and starting with the ideal gas equation PV=nRT and dividing through by volume V, one obtains P=(nRT)/V, where the expression nR/V is density ρ.

In typical applications, the pressure drop through the sensor is relatively low (e.g. less than a few torr), such that one may ignore the density gradient along the height of the sensor inlet and outlet portions and assume a constant density of fluid in the sensor inlet and outlet portions to determine the mass of fluid in each. This mass of fluid in each of the sensor inlet portion and the sensor outlet portion may be expressed as m=A*h*ρ, where "m" is mass, "A" is the internal cross-section area of the sensor inlet and outlet portions, and "ρ" is the density of the fluid in the inlet or outlet portion. Since pressure may be expressed as force divided by area (P=F/A) and also as mass times acceleration (F=ma), and acceleration "a" in the gravitation field is the constant "g" (gravity), the pressure exerted by the column of fluid in the sensor inlet and outlet portions may be expressed as P=F/A=(A*h*ρ*g)/

$A=\rho*g*h$, and thus, the pressure difference exerted by the columns of fluid in the inlet and outlet portions of the sensor may be expressed as:

$$\Delta P=(\overline{\rho_{inlet}}-\overline{\rho_{outlet}})g*h \quad \text{(Equation 3)}$$

Where $\Delta P$=Pressure difference between sensor inlet and outlet portions;

$\overline{\rho_{inlet}}$=Mean density of the fluid in the inlet portion of the sensor; and $\overline{\rho_{outlet}}$=Mean density of the fluid in the outlet portion of the sensor Assuming an ambient temperature of 25° C. (300 K) and a 100° C. temperature difference between the temperature of the fluid entering the sensor inlet portion and the temperature of the fluid in the sensor measuring portion, the fluid entering the sensor inlet portion will have a greater density than that of the fluid in the sensor measuring portion based upon the 30% temperature difference therebetween. Flowing fluid through the sensor transports less dense fluid from the sensor measuring portion to the sensor outlet portion causing the mean density of the fluid in the sensor inlet portion to be greater than the mean density of the fluid in the sensor outlet portion. It should be appreciated that this effect will be observed in any mass flow sensor where the temperature of the fluid is raised (or lowered), irrespective of the manner in which the mass flow rate is determined (e.g., a constant current sensor, a constant temperature sensor, a constant temperature rise above ambient sensor, etc.)

Assuming that the effective height "h" (which is based upon the actual height of the sensor inlet and outlet portions and their angle of inclination) and the internal cross-sectional area of the sensor inlet and outlet portions are the same (which is a reasonable assumption where the sensor inlet, outlet and measuring portions are integrally formed from the same conduit), then the pressure difference that is due to the orientation of the sensor can be determined based upon the effective height of the sensor inlet and outlet portions and the density of the fluid in each as described above.

In the illustrated embodiment of FIG. 3 for example, the effective height of the sensor inlet and outlet portions may be determined based upon the actual height (i.e., the length) of the sensor inlet or outlet portion multiplied by the cosine of the angle by which the sensor inlet and outlet portions deviate from vertical (e.g. the Y axis), or alternatively, as the height of the sensor inlet or outlet portions multiplied by the sine of the angle by which the sensor inlet and outlet portions deviate from the horizontal (e.g., the Z axis). Having determined the difference in the pressure of the fluid in the inlet and outlet portions of the sensor, a correction therefore may be applied to the mass flow signal provided by the sensor to provide a corrected mass flow signal that accounts for any density effects due to the orientation of the mass flow meter in its service position. For example, an exemplary calculation for the error introduced by the density effect may take the following form:

$$e_{Density}=(1+K*\Delta P) \quad \text{(Equation 4)}$$

Where $e_{Density}$=Density effect correction factor;

$\Delta P$=Pressure difference between sensor inlet and outlet portions (Equation 3); and K=A gain constant related to the specific design of the mass flow meter.

In the above Equation 4, the correction factor for the density effect reflects the fact that the amount of error due to this effect varies relative to rate of fluid flow through the mass flow sensor.

It should be appreciated that by associating an inclination sensor with a thermal mass flow sensor, compensation for any inaccuracies that may result from installing the thermal mass flow meter in an orientation other than that in which it was specifically intended to be used may be provided. This is advantageous because even if one desires to install the flow meter in its intended orientation, practical realities of the site in which it is used may prevent this from being achieved. Moreover, by associating an inclination sensor with a thermal mass flow sensor, the same flow meter may be used in different orientations resulting in a reduction in inventory for the manufacturer of the flow meter, the end user, or both, as separately configured thermal mass flow meters for different orientations are no longer required.

Figure 4:
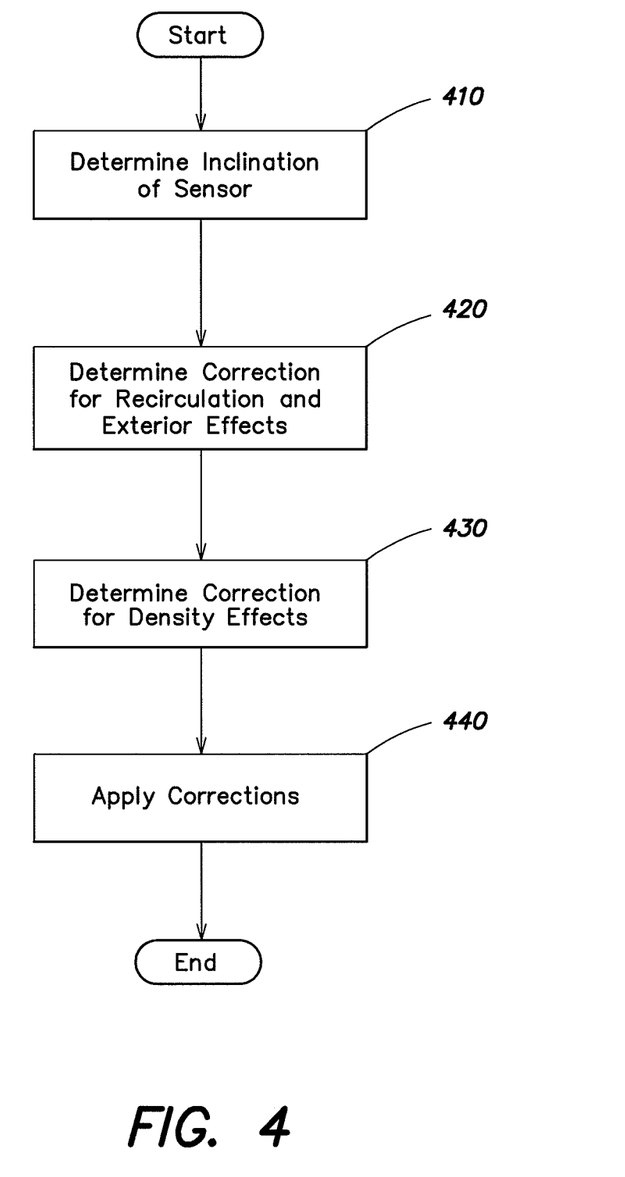
FIG. 4 illustrates a compensation routine that can be used by a mass flow meter to compensate for inaccuracies due to the orientation of a thermal mass flow sensor.

To illustrate the manner in which orientation induced inaccuracies may be determined and the manner in which compensation therefore may be provided, a compensation routine for use with a thermal mass flow meter such as illustrated in FIG. 3 is now described with respect to FIG. 4.

In act 410, a controller, such as controller 360A in FIG. 3, queries one or more inclination sensors capable of identifying an angle of inclination of the thermal mass flow sensor with respect to at least one reference axis. It should be appreciated that this act is preferably performed after the flow meter is installed in the position in which it is intended to be used (i.e., in its service position). Further, as noted previously with respect to FIG. 3, the at least one reference axis preferably includes at least two reference axes that are preferably orthogonal to one another, and preferably includes at least one reference axis that is not parallel to the sensor measuring portion 346C. In the embodiment depicted in FIG. 3, these at least two reference axes identify the degree to which the sensor measuring portion deviates from horizontal and the direction in which each of the sensor inlet portion and sensor outlet portion (i.e., the legs of the sensor) point. Where separate inclination sensors are provided corresponding to each reference axis, the controller may query each inclination sensor in turn, although it should be appreciated that a single inclination sensor may be used to identify the angle of inclination with respect to more than one reference axis. After querying the one or more inclination sensors, the compensation routine proceeds to act 420.

In act 420 the compensation routine determines a combined correction factor for recirculation and exterior effects that accounts for any inaccuracies in the mass flow output signal due these effects and the orientation of the sensor. In one embodiment, this act may be performed in accordance with Equation 2, and with available pressure and temperature data that may be provided to the controller via one or more temperature and pressure sensors (e.g. temperature sensors 370A, 370B, and pressure sensor(s) 375) that may be associated with the thermal mass flow meter, or with the process fluid system in which the flow meter is used (e.g., disposed at the inlet or outlet of another fluid component coupled to the mass flow meter 300). Preferably, this determination is also based on fluid specific information that may, for example, be stored in a memory (e.g., memory 360B) of the thermal mass flow meter. For example, a lookup table that includes information such as the density and viscosity of various fluids at different temperatures and/or pressures may be stored in the memory of the thermal mass flow meter, and based upon an input specifying the specific type of fluid being used, this information may be accessed by the controller and used to calculate the combined correction factor. It should be appreciated that rather than determining a combined correction factor in accordance with Equation 2, separate correction factors for recirculation effects (the first expression in Equation 2) and exterior effects (the second expression in Equation 2) may alternatively be determined in separate acts, and summed.

In act 430, the compensation routine determines a correction factor for density or rho-g-h effects that accounts for any density-based inaccuracies in the mass flow output signal due primarily to the orientation of the sensor legs (i.e., sensor inlet and outlet portions 346A, 346B). In one embodiment, this act is performed in accordance with Equations 3 and 4, and with specific information pertaining to the sensor (such as, the length and internal cross-sectional area of the sensor inlet and outlet portions, the interior surface finish of the sensor, etc.) which may be stored in a memory (e.g., memory 360B) of the thermal mass flow meter. Preferably, this determination is also based upon fluid specific information that may also be stored in memory (e.g., memory 360B) of the flow meter, such as the density of various fluids at varying temperatures and pressures. It should be appreciated that although the act of determining the correction factor for density effects (act 430) is described with respect to FIG. 4 as being performed after the act of determining the combined correction factor for recirculation and exterior effects (i.e., act 420), corrections for each of these effects may be performed in any order. Moreover, it should be appreciated that the correction factors for each of these effects may be combined into a single correction factor that accounts for recirculation effects, exterior effects, and density effects.

In act 440, the correction factors determined in acts 420 and 430 (or a combined correction factor accounting for all three effects) are applied to the output signal of the thermal mass flow meter, such that the output mass flow signal provided by the thermal mass flow meter accounts for any orientation induced inaccuracies attributable to the installed orientation of the flow meter. For example, once these correction factors have been calculated, they may simply be stored in a memory (e.g., memory 360B) of the flow meter and then multiplied and summed with the uncompensated output signal of the flow meter to provide a compensated mass flow signal. An exemplary calculation for the compensated flow signal may take the following form:

$$F = e_{Recirculation+Exterior} + (e_{Density} * f) \quad \text{(Equation 5)}$$

Where

F=Compensated mass flow signal;

$e_{Recirculation+Exterior}$=Combined Recirculation and Exterior effect correction factor (Equation 2);

$e_{Density}$=Density effect correction factor (Equation 4); and f=Flow rate output signal of the mass flow meter.

In accordance with one embodiment, the act 410 of determining the inclination of the thermal mass flow sensor need only be performed after the flow meter is installed in its service position, or upon installation in a new service position. For example, to ensure that the orientation of the flow sensor is accounted for, the determination of the inclination of the flow sensor may be performed upon power up of the thermal mass flow meter after any other initialization routines have been performed. Although acts 420 and 430 may also be performed as part of the power up initialization procedure of the thermal mass flow meter, these acts are preferably performed during each operational cycle of the flow meter (e.g., at each interval wherein the mass flow rate of the fluid is determined).

It should be appreciated that because the inaccuracies due to recirculation effects, exterior effects, and density effects may be expected to vary dependent upon the flow rate of fluid, the controller may further store additional information that identifies the degree to which each correction coefficient is applied based upon the indicated flow rate. Thus for example, at very low flow rates, the correction coefficients may be applied to the uncompensated flow signal at or nearly at 100%, while at higher flow rates the correction coefficients may be applied at less than this amount (e.g., 20%). It should be appreciated that amount by which a certain correction coefficient may be applied at a given flow rate may differ from that of another. The degree to which a particular correction coefficient applies at a particular flow rate may be empirically determined and stored, for example, in a lookup table in a memory of the thermal mass flow meter, and may be fluid specific.

Although embodiments of the present invention have been described primarily with respect to a thermal mass flow meter that is intended to be installed and used in a stationary environment, it should be appreciated that by associating an inclination sensor with a thermal mass flow sensor, such a device may be used in a non-inertial or accelerating environment. Where, for example, the thermal mass flow meter is used in such a non-inertial environment, act 410 may be repeated during each operational cycle of the flow meter, and the determinations performed in acts 420 and 430 updated based thereon. It should be appreciated that if the thermal mass flow meter were used in such a non-inertial environment, equations 1-5 would be modified to reflect the orientation of the sensor with respect to the non-inertial field. For example, in equations 3 and 4, the law of sines could be used to determine the effective force of acceleration in the gravitational field in a manner analogous to that used to determine an effective height of the sensor.

Although the present invention has been described primarily in terms of a thermal mass flow meter, it should be appreciated that aspects of the present invention apply equally to a thermal mass flow controller, or to any other process fluid device that incorporates a thermal mass flow sensor. For example, aspects of the present invention may be used with a thermal mass flow controller 500, such as that illustrated functionally in FIG. 5, where a controlled valve 550 is integrated with a thermal mass flow sensor 346 to form an integrated mass flow controller (as shown), or where the controlled valve 550 is separate therefrom (not shown). As discussed previously, the thermal mass flow sensor 346 may be one in which the process fluid is heated or is cooled, and the controlled valve 500 may alternatively be disposed upstream of the thermal mass flow sensor rather than downstream thereof.

Figure 5:
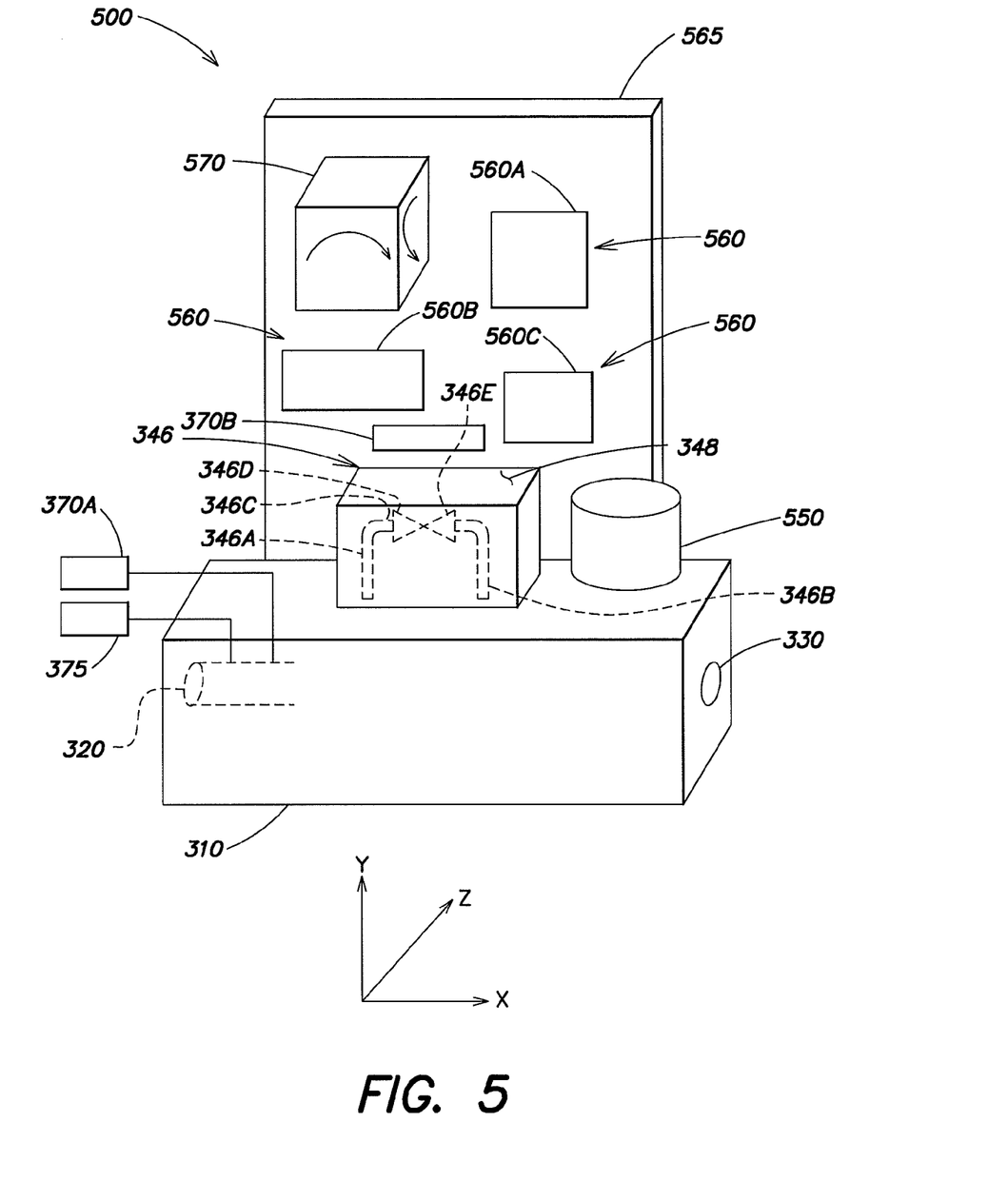
FIG. 5 illustrates a functional block diagram of a mass flow controller in accordance with an embodiment of the present invention.

As shown in FIG. 5, the mass flow controller 500 includes a base 310 having a fluid inlet 320 and a fluid outlet 330, a thermal mass flow sensor 346, a valve 550, and some associated control electronics 560. As in the mass flow meter 300, the mass flow controller may include one or more temperature sensors 370A, 370B, and one or more pressure sensors 375 to provide more accurate temperature and pressure data. Where the thermal mass flow controller is used to control toxic or reactive fluids such as those used in semiconductor processing, the base 310 may be made of a suitable type of material, such as stainless steel, although for other applications the base 310 may be made or formed from other suitable materials, such as aluminum, brass, or plastic.

The thermal mass flow sensor 346, which may also be made from stainless steel or other suitable materials, receives a portion of the process fluid that is received at the fluid inlet 320, and again includes a sensor inlet portion 346A, a sensor outlet portion 346B, and a sensor measuring portion 346C about which two resistive coils or windings 346D, 346E are disposed and which is fluidly coupled to the sensor inlet portion and the sensor outlet portion. The thermal mass flow controller may include a pressure dropping bypass (not shown) through which a remaining portion of the fluid received at the fluid inlet 320 flows, although it should be appreciated that the pressure dropping bypass may be omitted in certain implementations (e.g., where the mass flow controller is designed for use with lower flow rates).

The control electronics 560 will typically include some form of a controller 560A, such as a microprocessor or digital signal processor, some memory 560B (such as RAM, ROM, flash memory, or combinations thereof) operatively connected to the controller that can store code and/or data to be executed and/or used by the controller, and the electronics 560C associated with the thermal mass flow sensor and the valve. The control electronics will again typically be mounted to a printed circuit board 565 that is attached to the thermal mass flow sensor 346, the base 310, or both, although it should be appreciated that the control electronics need not be attached to either the mass flow sensor or the base, or even integrated within the mass flow controller, as they may be separated therefrom. Examples of control electronics that may be used in a mass flow controller are described in commonly owned U.S. Pat. No. 6,962,164 B2, which is herein incorporated by reference in its entirety.

In contrast to a conventional mass flow controller and in accordance with the present invention, the mass flow controller 500 of FIG. 5 also includes an inclination sensor 570 that is capable of providing a signal indicative of the angle of inclination of at least one of the sensor inlet portion 346A, the sensor outlet portion 346B, and the sensor measuring portion 346C relative to at least one reference axis. In a manner similar to that described previously with respect to the mass flow meter of FIG. 3, the inclination sensor 570 is preferably capable of indicating the angle of inclination with respect to those axes that have the greatest effect on the accuracy of the thermal mass flow sensor, at least one of which is not parallel with the heated (or cooled) sensor measuring portion. As in the mass flow meter of FIG. 3, the inclination sensor need not be attached to the thermal mass flow sensor, the base, or the printed circuit board, provided that the inclination sensor is capable of correctly identifying the inclination of at least one portion of the sensor relative to at least one reference axis. In a manner analogous to that described previously with respect to FIG. 3, the mass flow controller 500 can therefore determine the orientation of the mass flow sensor and compensate for inaccuracies in the mass flow rate signal that are due to recirculation effects, exterior effects, density effects, or a combination of these effects. As the manner in which the mass flow rate signal may be compensated has already been described in detail with respect to the mass flow meter of FIG. 3, further description is omitted herein.

Other devices which may utilize aspects of the present invention may include any device that utilizes a thermal mass flow sensor, such as certain types of pressure controllers. Certain pressure controller, such as those previously sold by Unit Instruments, may include a thermal mass flow meter section and a modulating valve section, with either an integral pressure sensor or the capability of receiving an external pressure signal. The servo electronics used to operate the device can adjust the valve to maintain a desired pressure in the apparatus to which it is connected (typically a wafer processing chamber), but may additionally provide a mass flow signal as an output. For example, such a device may be used to cool a semiconductor wafer within an etch process by providing an inert gas, like helium, for cooling. The mass flow signal may be used in such a device as a diagnostic signal to determine whether the semiconductor wafer was properly seated in the process chamber, and would suffer from similar sorts of orientation dependent errors by virtue of the thermal mass flow sensor used therein.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A mass flow meter having a fluid inlet and a fluid outlet, comprising:
a thermal mass flow sensor to provide a first electrical signal indicative of a mass flow rate of a fluid flowing between the fluid inlet and the fluid outlet, the thermal mass flow sensor having a sensor inlet portion fluidly connected to the fluid inlet, a sensor outlet portion fluidly connected to the fluid outlet, and a sensor measuring portion disposed between and fluidly connected to the sensor inlet portion and the sensor outlet portion;
at least one inclination sensor to provide at least one second electrical signal indicative of an angle of inclination of at least one of the sensor inlet portion, the sensor outlet portion, and the sensor measuring portion relative to at least one reference axis; and
a controller, to receive the first electrical signal and the at least one second electrical signal, calculate a correction factor based upon the at least one second electrical signal, and apply the correction factor to the first electrical signal to provide a third electrical signal indicative of the mass flow rate of the fluid flowing between the fluid inlet and the fluid outlet that is compensated for the angle of inclination of the at least one of the sensor inlet portion, the sensor outlet portion, and the sensor measuring portion relative to the at least one reference axis.

2. The mass flow meter of claim 1, wherein the third electrical signal is compensated for differences in a density of the fluid in the sensor inlet portion and a density of the fluid in the sensor outlet portion.

3. The mass flow meter of claim 2, wherein an amount of compensation in the third electrical signal for the differences in the density of the fluid in the sensor inlet portion and the density of fluid in the sensor outlet portion is proportional to a difference in the density of the fluid in the sensor inlet portion and the density of the fluid in the sensor outlet portion, multiplied by a force of a gravitational field in an orientation in which the thermal mass flow sensor is to be operated and an effective height of the sensor inlet portion and the sensor outlet portion in a direction of the gravitational field in the orientation in which the thermal mass flow sensor is to be operated.

4. The mass flow meter of claim 2, wherein the thermal mass flow sensor is enclosed within a sensor housing, and wherein the third electrical signal is further compensated for convective effects between the sensor housing and its surrounding environment.

5. The mass flow meter of claim 2, wherein the thermal mass flow sensor is enclosed within a sensor housing, the sensor housing is enclosed within a second outer housing, and wherein the third electrical signal is further compensated for convective effects between the sensor housing and the second outer housing.

6. The mass flow meter of claim 1, wherein the thermal mass flow sensor is enclosed within a sensor housing, and wherein the third electrical signal is compensated for convective effects between the sensor housing and its surrounding environment.

7. The mass flow meter of claim 6, wherein an amount of compensation in the third electrical signal for the convective effects between the sensor housing and its surrounding environment is proportional to a fixed constant multiplied by the angle of inclination of the at least one of the sensor inlet portion, the sensor outlet portion, and the sensor measuring portion relative to the at least one reference axis, and wherein the fixed constant is determined during calibration of the mass flow meter under vacuum conditions.

8. The mass flow meter of claim 1, wherein the thermal mass flow sensor is enclosed within a sensor housing, the sensor housing is enclosed within a second outer housing, and wherein the third electrical signal is further compensated for convective effects between the sensor housing and the second outer housing.

9. The mass flow meter of claim 1, further comprising:
an adjacent fluid flow path having a flow path inlet disposed proximate to the sensor inlet portion and fluidly connected to the fluid inlet, and a flow path outlet disposed proximate to the sensor outlet portion and fluidly connected to the fluid outlet.

10. The mass flow meter of claim 9, further comprising:
a bypass disposed in the adjacent fluid flow path.

11. The mass flow meter of claim 9, wherein the third electrical signal is compensated for recirculation of fluid between the thermal mass flow sensor and the adjacent fluid flow path.

12. The mass flow meter of claim 11, wherein the third electrical signal is further compensated for differences in a density of the fluid in the sensor inlet portion and a density of the fluid in the sensor outlet portion.

13. The mass flow meter of claim 12, wherein the thermal mass flow sensor is enclosed within a sensor housing, the sensor housing is enclosed within a second outer housing, and wherein the third electrical signal is further compensated for convective effects between the sensor housing and the second outer housing.

14. The mass flow meter of claim 11, wherein the thermal mass flow sensor is enclosed within a sensor housing, the sensor housing is enclosed within a second outer housing, and wherein the third electrical signal is further compensated for convective effects between the sensor housing and the second outer housing.

15. The mass flow meter of claim 9, wherein the at least one second electrical signal is indicative of an angle of inclination of the sensor measuring portion relative to the at least one reference axis, and wherein the third electrical signal is compensated for recirculation of fluid between the thermal mass flow sensor and the adjacent fluid flow path.

16. The mass flow meter of claim 15, wherein an amount of compensation in the third electrical signal for the recirculation of the fluid between the thermal mass flow sensor and the adjacent fluid flow path is proportional to a difference in density between the fluid in the sensor measuring portion and the fluid in the adjacent fluid flow path, multiplied by a function of the angle of inclination of the sensor measuring portion relative to the at least one reference axis.

17. The mass flow meter of claim 15, wherein an amount of compensation in the third electrical signal for the recirculation of the fluid between the thermal mass flow sensor and the adjacent fluid flow path is proportional to a difference in density between the fluid in the sensor measuring portion and the fluid in the adjacent fluid flow path, multiplied by a function of the angle of inclination of the sensor measuring portion relative to the at least one reference axis, and divided by a mean viscosity of the fluid in the sensor measuring portion.

18. The mass flow meter of claim 9, wherein the at least one second electrical signal is indicative of an angle of inclination of the sensor inlet portion, the sensor outlet portion, and the sensor measuring portion relative to three orthogonal reference axes, and wherein the third electrical signal is compensated for recirculation of fluid between the thermal mass flow sensor and the adjacent fluid flow path and for differences in a density of the fluid in the sensor inlet portion and a density of the fluid in the sensor outlet portion.

19. The mass flow meter of claim 18, wherein an amount of compensation in the third electrical signal for the differences in the density of the fluid in the sensor inlet portion and the density of fluid in the sensor outlet portion is proportional to a difference in the density of the fluid in the sensor inlet portion and the density of the fluid in the sensor outlet portion, multiplied by a force of a gravitational field in an orientation in which the thermal mass flow sensor is to be operated and an effective height of the sensor inlet portion and the sensor outlet portion in a direction of the gravitational field in the orientation in which the thermal mass flow sensor is to be operated.

20. The mass flow meter of claim 19, wherein an amount of compensation in the third electrical signal for the recirculation of the fluid between the thermal mass flow sensor and the adjacent fluid flow path is proportional to a difference in density between the fluid in the sensor measuring portion and the fluid in the adjacent fluid flow path, multiplied by a function of the angle of inclination of the sensor measuring portion relative to the three orthogonal reference axes, and divided by a mean viscosity of the fluid in the sensor measuring portion.

21. The mass flow meter of claim 20, wherein the thermal mass flow sensor is enclosed within a sensor housing, the sensor housing is enclosed within a second outer housing, and wherein the third electrical signal is further compensated for convective effects between the sensor housing and the second outer housing.

22. The mass flow meter of claim 21, wherein an amount of compensation in the third electrical signal for convective effects between the sensor housing and the second outer housing is proportional to a fixed constant multiplied by the angle of inclination of the sensor inlet portion, the sensor outlet portion, and the sensor measuring portion relative to the three orthogonal reference axes, and wherein the fixed constant is determined during calibration of the mass flow meter under vacuum conditions.

23. The mass flow meter of claim 18, wherein the thermal mass flow sensor is enclosed within a sensor housing, the sensor housing is enclosed within a second outer housing, and wherein the third electrical signal is further compensated for convective effects between the sensor housing and the second outer housing.

24. The mass flow meter of claim 23, further comprising:
at least one temperature sensor, operatively coupled to the controller, to measure a temperature of the fluid in at least one location disposed between the fluid inlet and the fluid outlet;
wherein a value of the density of the fluid in the sensor inlet portion and the sensor outlet portion is adjusted based upon the measured temperature.

25. The mass flow meter of claim 24, further comprising:
at least one pressure sensor, operatively coupled to the controller, to measure a pressure of the fluid in at least one location disposed between the fluid inlet and the fluid outlet;
wherein the density of the fluid in the sensor inlet portion and the sensor outlet portion is further adjusted based upon the measured pressure.

26. The mass flow meter of claim 23, wherein the mass flow meter is included within a mass flow controller, the mass flow controller including a controlled valve.

27. The mass flow meter of claim 23, wherein an amount of compensation for at least one of the recirculation of fluid between the thermal mass flow sensor and the adjacent fluid flow path, the differences in the density of the fluid in the sensor inlet portion and the density of the fluid in the sensor outlet portion, and the convective effects between the sensor housing and the second outer housing, is adjusted based upon the mass flow rate of the fluid flowing between the fluid inlet and the fluid outlet.

28. A method of determining a mass flow rate of a fluid flowing in a fluid flow path that includes a sensor flow path having a sensor inlet portion, a sensor outlet portion, and a sensor measuring portion, the method comprising acts of:
determining a flow rate of the fluid flowing in the sensor measuring portion of the sensor flow path;
determining an angle of inclination of at least one of the sensor inlet portion, the sensor outlet portion, and the sensor measuring portion relative to at least one reference axis;
calculating at least one correction factor based upon the determined angle of inclination of the at least one of the sensor inlet portion, the sensor outlet portion, and the sensor measuring portion relative to at least one reference axis; and
determining the mass flow rate of the fluid flowing in the fluid flow path based upon the determined flow rate of the fluid flowing in the sensor measuring portion of the sensor flow path and the at least one calculated correction factor.

29. The method of claim 28, wherein the act of calculating includes an act of calculating a first correction factor that accounts for differences in a density of the fluid in the sensor inlet portion and a density of the fluid in the sensor outlet portion, and the determined angle of inclination of at least one of the sensor inlet portion and the sensor outlet portion relative to the at least one reference axis.

30. The method of claim 29, wherein the first correction factor is proportional to a difference in the density of the fluid in the sensor inlet portion and the density of the fluid in the sensor outlet portion, multiplied by a force of a gravitational field in an orientation in which the sensor flow path is to be operated and an effective height of the sensor inlet portion and the sensor outlet portion in a direction of the gravitational field in the orientation in which the sensor flow path is to be operated.

31. The method of claim 28, wherein the sensor flow path is enclosed within a sensor flow path housing, and wherein the act of calculating includes an act of calculating a first correction factor that accounts for convective effects between the sensor flow path housing and its surrounding environment, and the determined angle of inclination of the at least one of the sensor inlet portion, the sensor outlet portion, and the sensor measuring portion relative to the at least one reference axis.

32. The method of claim 31, wherein the first correction factor is proportional to a fixed constant multiplied by a function of the angle of inclination of the at least one of the sensor inlet portion, the sensor outlet portion, and the sensor measuring portion relative to the at least one reference axis, and wherein the fixed constant is determined during calibration of the sensor flow path under vacuum conditions.

33. The method of claim 28, wherein the fluid flow path further includes a first fluid flow path and the sensor flow path, the sensor flow path being fluidly connected to the first fluid flow path, wherein the act of calculating includes an act of calculating a first correction factor that accounts for recirculation of fluid between the first fluid flow path and the sensor flow path and the determined angle of inclination of the sensor measuring portion relative to the at least one reference axis.

34. The method of claim 33, wherein the first correction factor is proportional to a difference in density between the fluid in the sensor measuring portion and the fluid in the first fluid flow path, multiplied by a function of the angle of inclination of the sensor measuring portion relative to the at least one reference axis.

35. The method of claim 33, wherein the first correction factor is proportional to a difference in density between the fluid in the sensor measuring portion and the fluid in the first fluid flow path, multiplied by the angle of inclination of the sensor measuring portion relative to the at least one reference axis, and divided by a mean viscosity of the fluid in the sensor measuring portion.

36. The method of claim 28, wherein the fluid flow path further includes a first fluid flow path and the sensor flow path, the sensor flow path being fluidly connected to the first fluid flow path, wherein the act of determining the angle of inclination includes an act of determining the angle of inclination of the sensor inlet portion, the sensor outlet portion, and the sensor measuring portion relative to three orthogonal reference axes, and wherein the act of calculating includes acts of:
calculating a first correction factor that accounts for recirculation of fluid between the first fluid flow path and the sensor flow path and the determined angle of inclination of the sensor measuring portion relative to a first of the three orthogonal reference axes; and
calculating a second correction factor that accounts for differences in a density of the fluid in the sensor inlet portion and a density of the fluid in the sensor outlet portion, and the determined angle of inclination of the sensor inlet portion and the sensor outlet portion relative to a second of the three orthogonal reference axes.

37. The method of claim 36, wherein the sensor flow path is enclosed within a sensor flow path housing, and wherein the act of calculating further includes an act of:
calculating a third correction factor that accounts for convective effects between the sensor flow path housing and its surrounding environment, and the determined angle of inclination of at least one of the sensor inlet portion, the sensor outlet portion, and the sensor measuring portion relative to at least one the three orthogonal reference axes.

38. The method of claim 37, wherein the act of determining the mass flow rate of the fluid flowing in the flow path includes an act of taking a product of the determined flow rate of the fluid flowing in the sensor measuring portion with the second correction factor, and adding a sum of the first and third correction factors to the product.

* * * * *